United States Patent
Tamaoki

(10) Patent No.: US 8,368,706 B2
(45) Date of Patent: Feb. 5, 2013

(54) IMAGE PROCESSING DEVICE AND METHOD FOR PIXEL DATA CONVERSION

(75) Inventor: Nobumasa Tamaoki, Kobe (JP)

(73) Assignee: GVBB Holdings S.A.R.L., Luxembourg (LU)

( * ) Notice: Subject to any disclaimer, the term of this patent is extended or adjusted under 35 U.S.C. 154(b) by 582 days.

(21) Appl. No.: 12/451,571

(22) PCT Filed: Jun. 1, 2007

(86) PCT No.: PCT/JP2007/061187
§ 371 (c)(1),
(2), (4) Date: Nov. 19, 2009

(87) PCT Pub. No.: WO2008/146406
PCT Pub. Date: Dec. 4, 2008

(65) Prior Publication Data
US 2010/0103180 A1      Apr. 29, 2010

(51) Int. Cl.
*G06T 1/00* (2006.01)
(52) U.S. Cl. ......... 345/522; 345/501; 345/582; 345/660
(58) Field of Classification Search .......... 345/501–522, 345/582, 660
See application file for complete search history.

(56) References Cited

U.S. PATENT DOCUMENTS 6,825,857 B2 * 11/2004 Harasimiuk ................. 345/660
2007/0115294 A1 * 5/2007 Laksono ....................... 345/582

FOREIGN PATENT DOCUMENTS

JP    2002-237953    8/2002
JP    2004-135007    4/2004

OTHER PUBLICATIONS

Search Report Dated Jul. 30, 2007.
Office Action in Chinese Application No. 2007-80100121.1 mailed Jul. 10, 2012.

* cited by examiner

*Primary Examiner* — Xiao M. Wu
*Assistant Examiner* — Todd Buttram
(74) *Attorney, Agent, or Firm* — Arent Fox LLP

(57) ABSTRACT

An image processing apparatus according to the present invention includes a scaling unit, a coefficient texture processing unit, and a pixel data converter. A first array is passed to the scaling unit. In the first array, a plurality of pieces of pixel data is arranged in a matrix pattern. The scaling unit copies the pixel data included in the first array a predetermined number of times in the horizontal direction of the first array to configure a second array. The coefficient texture processing unit repetitively performs a computation using a predetermined coefficient texture for every predetermined number of pieces of pixel data included in the second array. The pixel data converter converts the components of the predetermined number of pieces of pixel data obtained by the computation using the coefficient texture into a predetermined pattern for every piece of pixel data. Particularly, the pixel data converter adds the components located at specific positions among the predetermined number of pieces of pixel data for every piece of pixel data to convert the components into one component.

18 Claims, 12 Drawing Sheets

FIG. 4

IMAGE PROCESSING DEVICE AND METHOD FOR PIXEL DATA CONVERSION

This application claims the benefit, under 35 U.S.C. §365 of International Application PCT/JP2007/061187, filed Jun. 1, 2007, which was published in accordance with PCT Article 21(2) on Dec. 4, 2008 in Japanese.

TECHNICAL FIELD

The present invention relates to an image processing apparatus, and more particularly, to a pixel data conversion process using the image processing apparatus.

BACKGROUND ART

Recently, as symbolized in animation used for movies and TV games, computer graphics (CG) have been remarkably developed. The remarkable development greatly depends on the progress of processors dedicated to graphics processing (GPU: Graphic Processor Unit). The GPU is a specialized chip for a computation process that is necessary for the graphic display. In general, the GPU has better performance of the image process than a CPU. If the computation processes performed by the CPU are taken over by the GPU, the image process can be performed rapidly, and the load on the CPU can be reduced. In addition, the bandwidth of a main memory that is allocated to processes other than the image process can be increased. Moreover, the frequency of data transfer between the CPU and a video memory (VRAM) is reduced. As a result, a high-speed and highly-functional graphic process can be implemented.

The computation processes performed by the GPU are mainly divided into three processes, that is, a two-dimensional CG process, a three-dimensional CG process, and a moving picture process. Particularly, the recent GPU has been rapidly developed in terms of the three-dimensional CG process. As the three-dimensional CG process of the GPU, there is a geometry process and a rendering process. In the geometry process, an arrangement which is formed by projecting each model envisioned in a three-dimensional virtual space on a two-dimensional screen is determined by a geometrical computation, particularly, a coordinate transformation. In the rendering process, data representing an image that is to be actually displayed on the two-dimensional screen is generated based on the arrangement of each model on the two-dimensional screen determined by the geometry process. The rendering process particularly includes imaging processes such as hidden surface removal, shading, and texture mapping.

In the geometry process, a dedicated pipeline referred to as a vertex shader is used. In the rendering process, a dedicated pipeline referred to as a pixel shader is used. In the recent GPU, both of the vertex shader and the pixel shader are programmable. Particularly, in the pixel shader, each image process is programmable in units of pixel. In the more advanced GPU, the number of instructions available to each shader is greatly increased, so that each shader can perform a two-dimensional CG process and a moving picture process as well as a higher functionality of the three-dimensional CG process. Since the computation performance of the GPU is much higher than the computation performance of the CPU in terms of the image process, the increase in the utility range of the shader is advantageous in implementing a higher speed/ higher functionality for the entirety of the image process.

Patent Document 1: Japanese Unexamined Patent Application, First Publication No. H9-185361

DISCLOSURE OF INVENTION

Problem to be Solved by the Invention

Pixel data have various formats. For example, respective components of the pixel data are generally represented on a monitor of a personal computer (PC) by three primary color signals R, G, and B. On the other hand, the respective components of the pixel data are generally represented on a television (TV) set by a luminance signal Y, a blue color-difference signal Cb, and a red color-difference signal Cr. In addition, even in the same color space, sampling frequencies of the respective components may be different from each other. For example, in the YCbCr 4:4:4, each of the components Y, Cb, and Cr is sampled for every one pixel. On the other hand, in the YCbCr 4:2:2, each luminance signal Y is sampled for every one pixel, and each of the color-difference signals Cb and Cr is sampled for every two pixels.

In whichever format the pixel data is represented, each component of the pixel data displayed on a real screen finally needs to be set for every pixel. For example, in the screen display step, the pixel data of the YCbCr 4:2:2 need to be converted into the pixel data of the YCbCr 4:4:4 by up-sampling.

However, in the conventional format conversion method for the pixel data, particularly, components are stored in the same memory area in an interleaved arrangement, and in the case where the format conversion is involved in the conversion of the sampling frequency for each component, in general, a computation process needs to be changed for every piece of pixel data. For example, in the up-sampling from the YCbCr 4:2:2 to the YCbCr 4:4:4, the process in the case where one piece of pixel data of the YCbCr 4:2:2 is converted into the even-numbered pixel data of the YCbCr 4:4:4 is different from the process in the case where the one piece of pixel data is converted into the odd-numbered pixel data of the YCbCr 4:4:4. Therefore, in the conventional conversion method, an operation of identifying whether the pixel data is odd-numbered or even-numbered as well as a conditional branching which "switches the processing according to the odd and even orders" are needed. These cannot be implemented by the pixel shader, and even if they could be implemented, a higher speed format conversion is remarkably prevented. Therefore, in the conventional image processing apparatus, the CPU needs to be used for the format conversion of pixel data. As a result, it is hard to realize further reduction of the load of the image process on the CPU, further increase in the bandwidth of the main memory for the processes other than the image process, and further decrease in the frequency of the data transfer between the CPU and the VRAM. In other words, in the conventional image processing apparatus, it is difficult to implement a higher speed image process.

An object of the present invention is to provide an image processing apparatus capable of implementing a higher speed image process by making it possible to execute format conversion of pixel data without conditional branching.

Means for Solving the Problem

An image processing apparatus according to the present invention includes a scaling unit, a coefficient texture processing unit, and a pixel data converter. The scaling unit configures a second array by a predetermined operation using a first array as a unit. In the first array, a plurality of pieces of pixel data are disposed in a matrix pattern. For example, the scaling unit copies the pixel data included in the first array a predetermined number of times in the horizontal direction of the first array to configure the second array. The coefficient texture processing unit repetitively performs a computation using a predetermined coefficient texture for every predetermined number of pieces of pixel data included in the second array. The pixel data converter converts the components of the predetermined number of pieces of pixel data obtained by the computation using the coefficient texture for every piece of pixel data. For example, the pixel data converter performs a computation of the components located at specific positions among the predetermined number of pieces of pixel data for every piece of pixel data to convert the components into one component.

In this manner, each pixel data included in the first array is converted into different pixel data. Preferably, the format of the pixel data is converted. Particularly, the sampling frequency of each component of the pixel data obtained by the pixel data converter is converted into a value different from the sampling frequency of each component of the pixel data included in the first array. Here, the computation process of the pixel data converter is common to all the pixel data, and particularly, includes no conditional branching.

This image processing apparatus may include a processor dedicated to graphic processing (GPU). In this case, the pixel data converter preferably uses a component rearranging function of the GPU for the conversion of each component of the pixel data. Here, the computation process of the pixel data converter is common to all the pixel data, and particularly, does not include any conditional branching. Accordingly, the pixel data converter preferably uses the pixel shader of the GPU for the conversion of each component of the pixel data.

Effect of the Invention

As described above, in the image processing apparatus according to the present invention, the format conversion of pixel data can be executed without the conditional branching. Accordingly, it is easy for the image processing apparatus according to the present invention to implement the entire image processes at a higher speed than a conventional apparatus.

BRIEF DESCRIPTION OF DRAWINGS

FIG. 4 is a schematic diagram showing an example of a first source array and a second source texture shown in FIG. 2.
FIG. 4(a) shows the source array.
FIG. 4(b) shows the source texture.
FIG. 5(a) shows pixel data of a source texture.
FIG. 5(b) shows pixel data of a coefficient texture.
FIG. 5(c) shows pixel data that is stored in registers in a computation process using the first pixel data of the source texture and the first pixel data of the coefficient texture.
FIG. 5(d) shows pixel data that is stored in registers in a computation process using the second pixel data of the source texture and the second pixel data of the coefficient texture.
FIG. 5(e) shows pixel data of a texture of an output destination.

FIG. 8(a) shows the source texture.
FIG. 8(b) shows the first texture.
FIG. 8(c) shows the second texture.

BEST MODE FOR CARRYING OUT THE INVENTION

Figure 1:
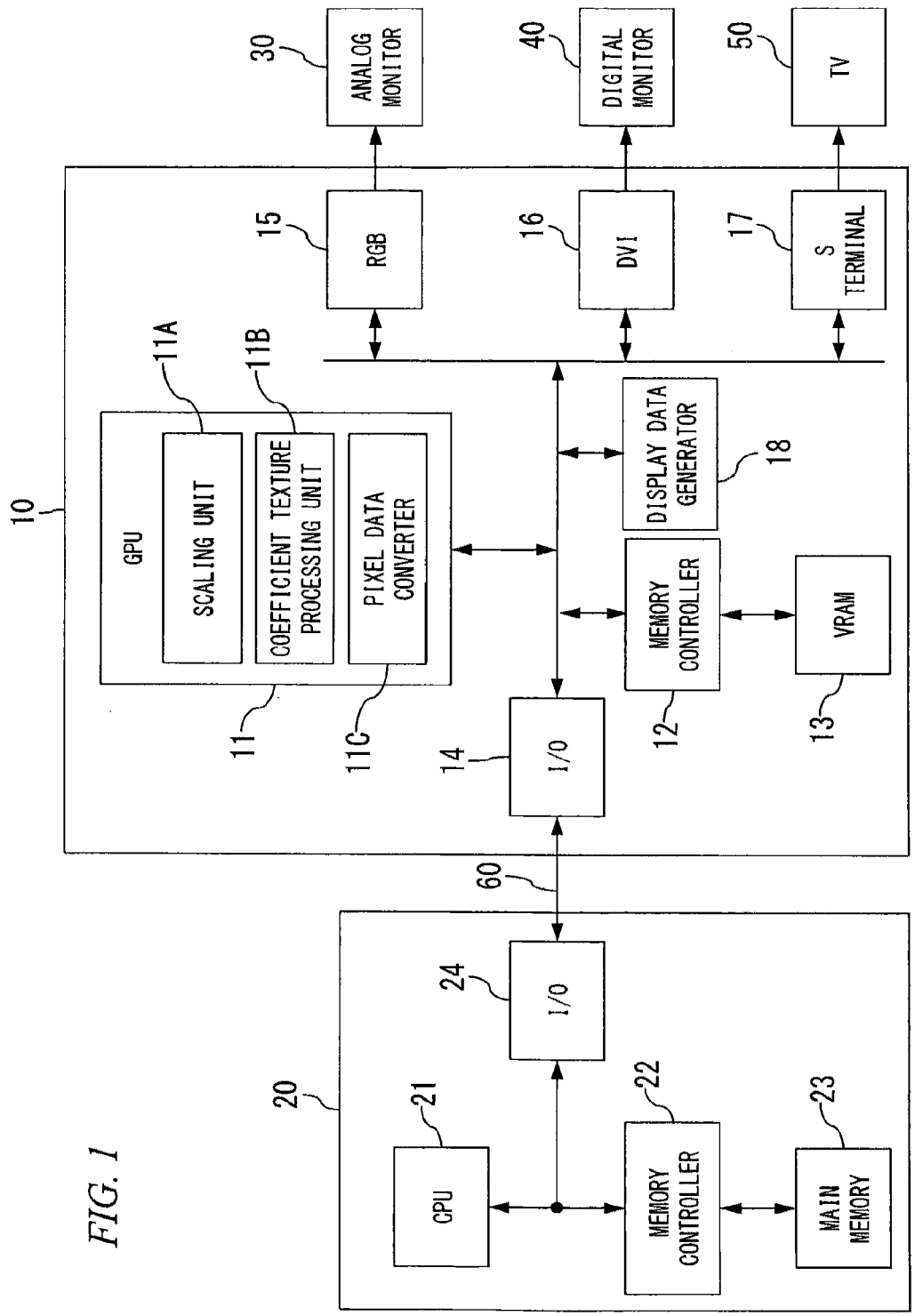
FIG. 1 is a block diagram showing an image processing system according to an embodiment of the present invention.

Hereinafter, an embodiment according to the present invention will be described.
FIG. 1 is a block diagram showing an image processing system according to an embodiment of the present invention. An image processing system 10 is preferably a graphic board and, together with a motherboard 20, is mounted on a computer. Here, the image processing system 10 may be integrated with the motherboard 20. Alternatively, the image processing system 10 may be assembled into a single chip. The image processing system 10 displays video on an analog monitor 30, a digital monitor 40, and a TV set 50 based on data from the motherboard 20.

The image processing system 10 preferably includes an image processing apparatus 11, a memory controller 12, a video memory (VRAM) 13, an input/output interface (I/O) 14, a display data generator 18, an analog RGB connector 15, a DVI connector 16, and an S terminal 17.

The image processing apparatus 11 is preferably a processor chip, and particularly, the instruction set architecture thereof is an SIMD. Here, the image processing apparatus 11 may be a single SIMD processor or a combination of a plurality of SISD processors. More preferably, the image processing apparatus 11 is a processor dedicated to graphics processing (GPU). Hereinafter, the case where the image processing apparatus 11 is the GPU is described. The GPU 11 instead of the CPU 21 performs computations necessary for the graphic display. The GPU 11 has a configuration of a conventional GPU. Here, the conventional GPU includes, for example, GeForce manufactured by NVIDIA, RADEON manufactured by AMD, or G965 manufactured by Intel.

The GPU 11 preferably includes a two-dimensional (2D) engine, a three-dimensional (3D) engine, and a video processing engine (VPE). The 2D engine performs a two-dimensional CG process. The 3D engine performs a three-dimensional CG process. The VPE performs a moving picture process (particularly, a process of decoding compressed data according to an MPEG scheme).

The 3D engine preferably includes a geometry engine and a rendering engine. The geometry engine includes a dedicated pipeline which is referred to as a vertex shader. The geometry engine performs a geometrical computation, particularly, a coordinate transformation using the vertex shader to project each model envisioned in a three-dimensional virtual space onto a two-dimensional screen. The rendering engine includes a dedicated pipeline which is referred to as a pixel shader. The rendering engine performs rendering on the two-dimensional screen by using the pixel shader with respect to each model projected on the two-dimensional screen by the geometry engine.

The vertex shader and the pixel shader are preferably programmable pipelines. In this case, each of the shaders may be used not only in the 3D engine but also in other engines. In programming of each of the shaders, Direct 3D is preferably used as a graphic API. Alternatively, Open GL may be used.

Each of the shaders preferably has a floating-point (FP) computation function. Particularly, in the pixel shader, input data may be represented as 16-bit or 32-bit FP display. In this case, the pixel shader can ensure a larger dynamic range than an integer computation in a process for color information of each pixel and a finer accuracy than a real minimum unit of a screen display in a process for pixel coordinates.

The memory controller 12 controls the VRAM 13. Particularly, the memory controller 12 performs data reading from the VRAM 13 and data writing into the VRAM 13 as well as refreshing of the VRAM 13. The memory controller 12 is connected to other components of the image processing system via internal buses to perform data communication between the components and the VRAM 13.

The VRAM 13 is preferably a synchronous DRAM (SDRAM). More preferably, the VRAM 13 is a DDR SDRAM or a GDDR SDRAM. A frame buffer and various textures are stored in the VRAM 13. The VRAM 13 is also used as a computation buffer of the GPU 11. Here, the frame buffer is a two-dimensional array corresponding to the pixels included in the screen of each of the monitors 30, 40, and 50. Each item of the frame buffer represents color information of one pixel. The texture is a two-dimensional array of the pixel data that is actually processed by the GPU 11.

The I/O 14 is an interface to an external bus 60, and the image processing system 10 and the motherboard 20 communicate the pixel data with each other via the external bus 60. The I/O 14 and the external bus 60 are preferably according to the standards PCI Express. Alternatively, the I/O 14 and the external bus 60 may be according to the standards PCI or the standards AGP.

The display data generator 18 selects the pixel data stored in the VRAM 13 according to the display screen and transmits the selected pixel data as display data to various types of video output interfaces 15, 16, and 17. Specifically, the display data generator 18 firstly makes a specific address range in the VRAM 13 correspond to the display screen. Next, every time a read address in the address range is generated, the display data generator 18 reads the pixel data from the read address, and outputs the pixel data as a series of display data.

The analog RGB connector 15 is a video output interface corresponding to the analog monitor 30. Here, the analog monitor 30 is preferably an LCD. Alternatively, the analog monitor 30 may be a CRT. The analog RGB connector 15 is preferably connected to the display data generator 18 via the internal bus to convert the display data output from the display data generator 18 into an analog RGB signal and output the analog RGB signal to the analog monitor 30. Here, the display data generator 18 selects and outputs the pixel data of the frame buffer stored in the VRAM 13 as the display data. Therefore, the video corresponding to the pixel data of the frame buffer is reproduced on the screen of the analog monitor 30.

The DVI connector 16 is a video output interface corresponding to the digital monitor 40). Here, the digital monitor 40 is preferably an LCD. Alternatively, the digital monitor 40 may be a digital projector. The DVI connector 15 is preferably connected to the display data generator 18 via the internal bus to convert the display data from the display data generator 18 into a DVI signal and output the DVI signal to the digital monitor 40. Here, the display data generator 18 selects and outputs the pixel data of the frame buffer stored in the VRAM 13 as the display data. Therefore, the video corresponding to the pixel data of the frame buffer is reproduced on the screen of the digital monitor 40.

The S terminal 17 is preferably a video output terminal corresponding to the TV set 50. Alternatively, the S terminal 17 may be a video output terminal corresponding to a video tape recorder (VTR). The S terminal 17 is preferably connected to the display data generator 18 via the internal bus to convert the display data output from the display data generator 18 into an NTSC TV signal, a PAL TV signal, or an HDTV TV signal and outputs the TV signal to the TV set 50. Here, the TV signal may be an S signal, a composite signal, or a component signal. The display data generator 18 selects and outputs the pixel data of the frame buffer stored in the VRAM 13 as the display data. Therefore, the video corresponding to the pixel data of the frame buffer is reproduced on the screen of the TV set 5040.

Note that, in the image processing system 10, other types of connectors, for example, an HDMI connector or a D terminal may be provided.

In the motherboard 20, various types of video data are preferably stored in the buffer of the main memory 23. Here, the video data includes video data reproduced from a recording medium by an HDD or a DVD drive in the same computer, video data delivered through an external LAN or the Internet, video data of a TV program converted by a TV capture board in the same computer, a telop or text data such as weather forecast generated in the same computer, and video data such as a graph or 3D CG. In the case where a single piece of video data or a combination of pieces of video data are displayed on each of the monitors 30, 40, and 50, or in the case where the video data is processed by the GPU 11, the video data is written in the frame buffer of the VRAM 13 in units of frame. Alternatively, the video data may be written in a predetermined area in the VRAM 13 and may be formed as a texture by the GPU 11. The GPU 11 applies a predetermined image process to each pixel data of the frame buffer by using the texture in the VRAM 13 and writes the result back in the frame buffer. In addition, the GPU 11 displays the pixel data of the frame buffer on each of the monitors 30, 40, and 50.

The video data stored in the buffer of the motherboard 20 is generally obtained by decoding the data compressed according to a predetermined encoding scheme, preferably, an MPEG2 scheme. Preferably, the pixel data is represented by YCbCr 4:2:2. On the other hand, in the image processing system 10, the pixel data is generally represented by RGB 4:4:4 or ARGB 4:4:4:4. Here, A denotes a transparency. Therefore, a suitable format conversion is required for communicating the pixel data between the CPU 21 and the GPU 11. Particularly, in the above-described embodiment, a sampling frequency of each component of the pixel data needs to be converted between 4:2:2 and 4:4:4.

As described below, the image processing system 10 performs the format conversion of pixel data by using only the computation process of the GPU 11.

Preferably, in the up-sampling from the YCbCr 4:2:2 to the YCbCr 4:4:4, the internal configuration of the GPU 11 is mainly used as three functional units of a scaling unit 11A, a coefficient texture processing unit 11B, and a pixel data converter 11C.

The scaling unit 11A copies each column of a predetermined texture by a predetermined number of times in the horizontal direction to convert the predetermined texture into another texture. The scaling unit 11A is preferably configured with a texture sampler of the pixel shader. Here, the number of copies can be programmed by setting scaling parameters.

The coefficient texture processing unit 11B repetitively performs the computation using the predetermined coefficient texture for every predetermined number of pieces of pixel data included in a predetermined texture. The coefficient texture processing unit 11B is preferably configured with a pixel shader. Here, the coefficient texture and the types of computation using the coefficient texture are programmable.

The pixel data converter 11C converts the components of the predetermined number of pieces of pixel data, which are obtained by the computation using the coefficient texture, for every piece of pixel data by the computation according to a predetermined pattern. Particularly, the pixel data converter 11C adds the components at specific positions among the components of the predetermined number of pieces of pixel data for every piece of pixel data to convert the components into one component. The pixel data converter 11C is preferably configured with a pixel shader. Here, a pattern of the conversion is programmable.

Figure 2:
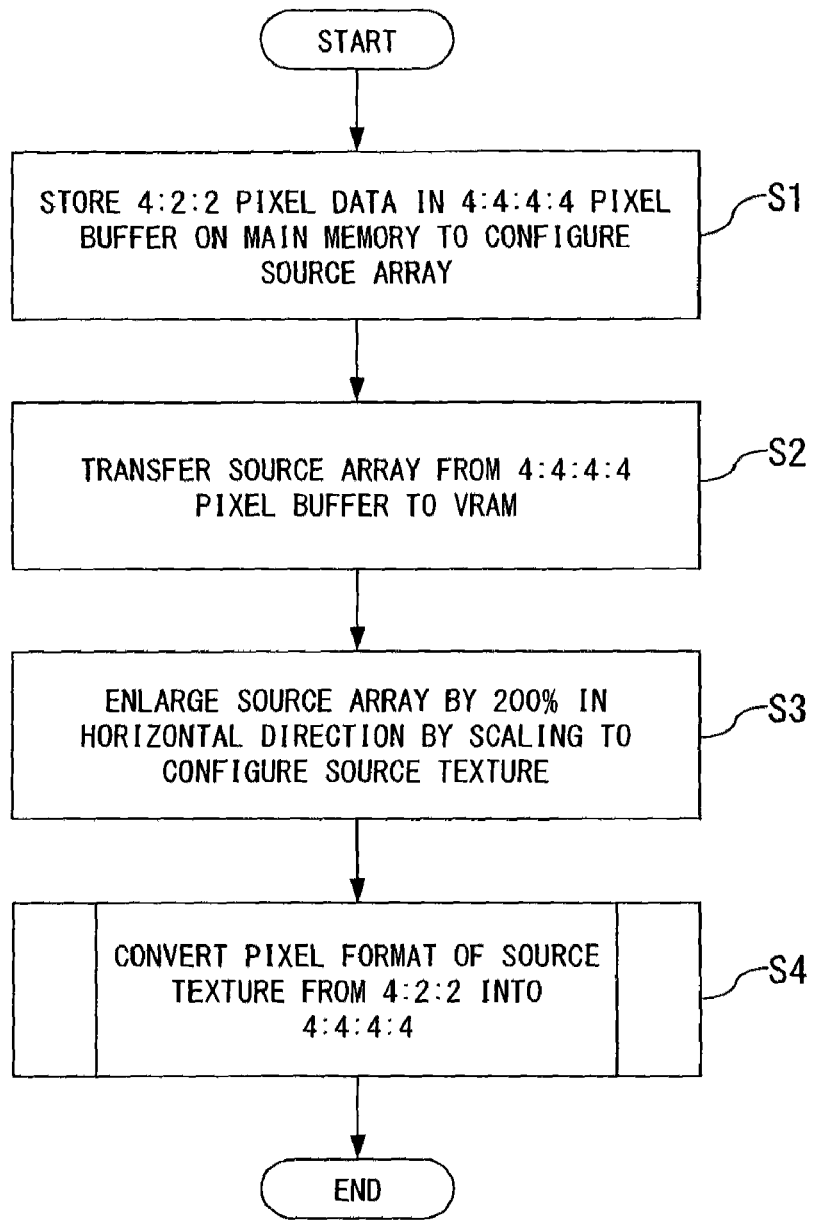
FIG. 2 is a flowchart showing format conversion of pixel data using up-sampling according to an embodiment of the present invention.

Up-sampling from the YCbCr 4:2:2 to the YCbCr 4:4:4 is preferably performed by the flowing steps. FIG. 2 shows a flowchart of the up-sampling.

Figure 4:
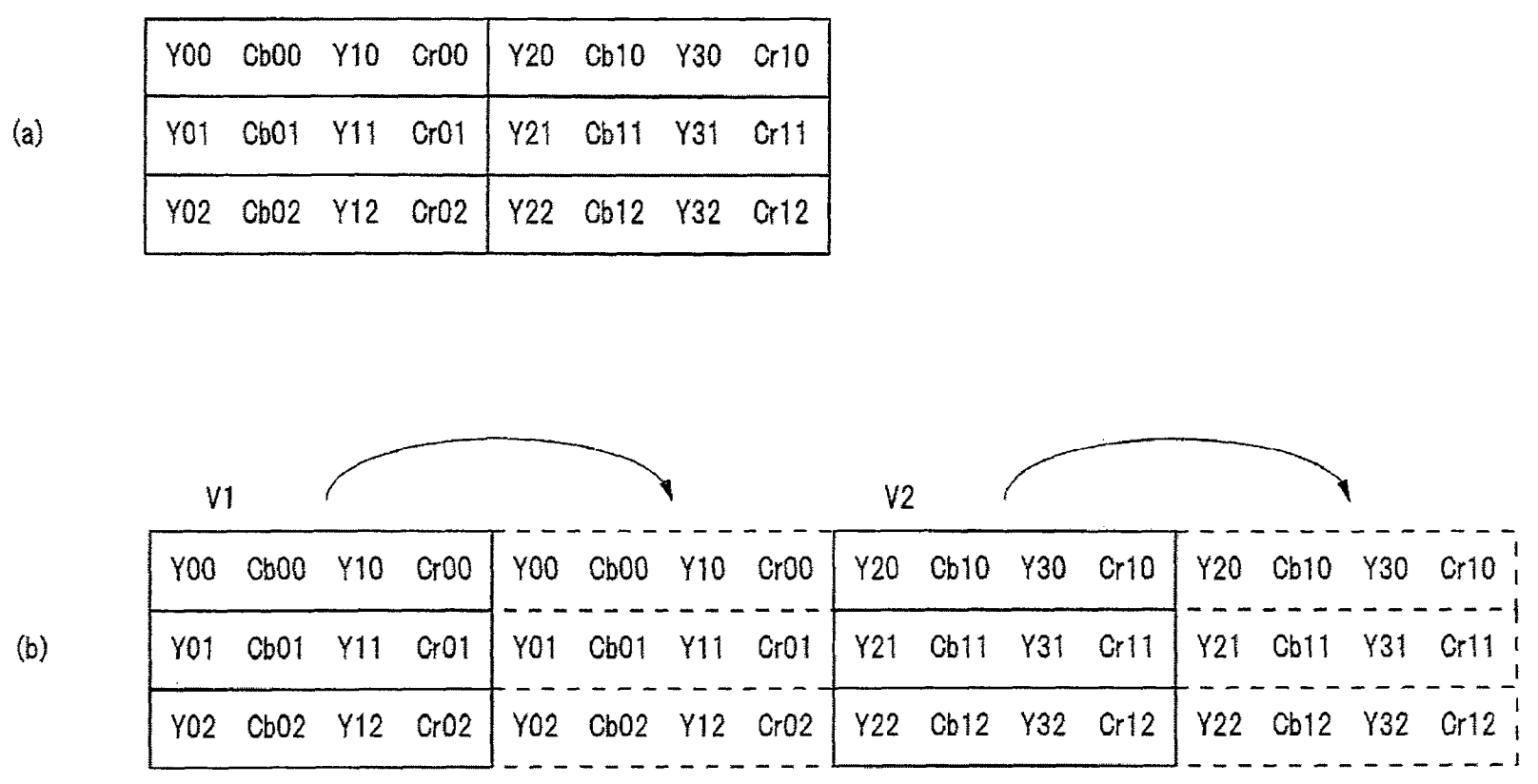

First step S1: The pixel data of the YCbCr 4:2:2 which is to be processed is stored in a 4:4:4:4 pixel buffer to configure the source array. Here, the 4:4:4:4 pixel buffer is disposed in the main memory 23 as a storage area for a two-dimensional array. Originally, four components of each piece of pixel data of the ARGB 4:4:4:4 are stored as one unit in the 4:4:4:4 pixel buffer. The source array is an interleaved array, and the four different components of the pixel data are stored as one unit in the 4:4:4:4 pixel buffer. The order of the four components in each pixel data can be arbitrarily set. FIG. 4(a) shows an example where the four components of each pixel data are arranged in a YUY2 format. In FIG. 4(a), the four components Y(2$i$, $j$), Cb($i$, $j$), Y(2$i$+1, $j$), and Cr($i$, $j$) ($i$, $j$=0, 1, 2, 3, ...) of each pixel data of the YCbCr 4:2:2 are stored as one unit in the 4:4:4:4 pixel buffer. Alternatively, the four components may be arranged in a UYVY format. In addition, the bit length of each component may be an 8 bit in the YUY2/UYVY format, or a 16-bit, or other values.

Second step S2: The source array is transferred from the main memory 23 to the VRAM 13 via the external bus 60. The transfer is preferably performed by direct memory access (DMA) between the memory controller 22 and the I/O 24 of the motherboard 20 and DMA between the memory controller 12 and the I/O 14 of the image processing system 10. Here, the source array is configured by the pixel data of the YCbCr 4:2:2. Accordingly, in comparison with the case where the format conversion of pixel data is performed by the CPU 21 and the pixel data is transferred to the VRAM 13, the amount of data to be transferred can be decreased. Therefore, particularly, the transfer rate of the pixel data via the external bus 60 between the I/O 24 of the motherboard 20 and the I/O 14 of the image processing system 10 can be reduced.

Third step S3: The source array is enlarged by 200% in the horizontal direction so as to configure the source texture. Specifically, as shown by broken lines in FIG. 4(b), each column V1, V2, ... of the source array is copied once in the horizontal direction. Therefore, in the source texture, the number of columns is increased to be twice the number of columns in the source array.

Figure 3:
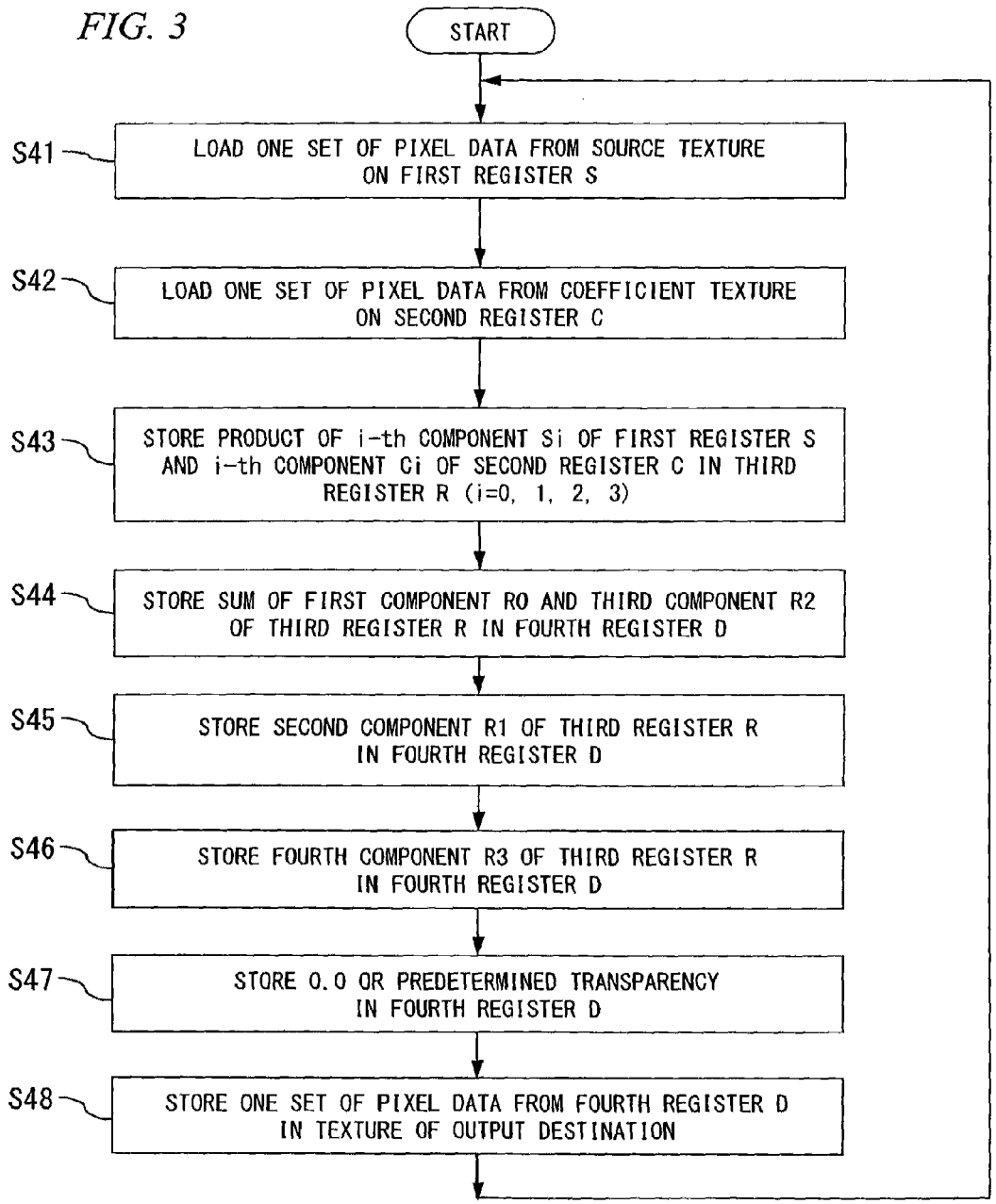
FIG. 3 is a detailed flowchart showing format conversion from 4:2:2 to 4:4:4 shown in FIG. 2

Fourth step S4: The format of each pixel data of the source texture is converted from 4:2:2 to 4:4:4 by using the GPU 11 in the order of the following sub steps S41 to S48. FIG. 3 shows a flowchart of the fourth step S4.

Figure 5:
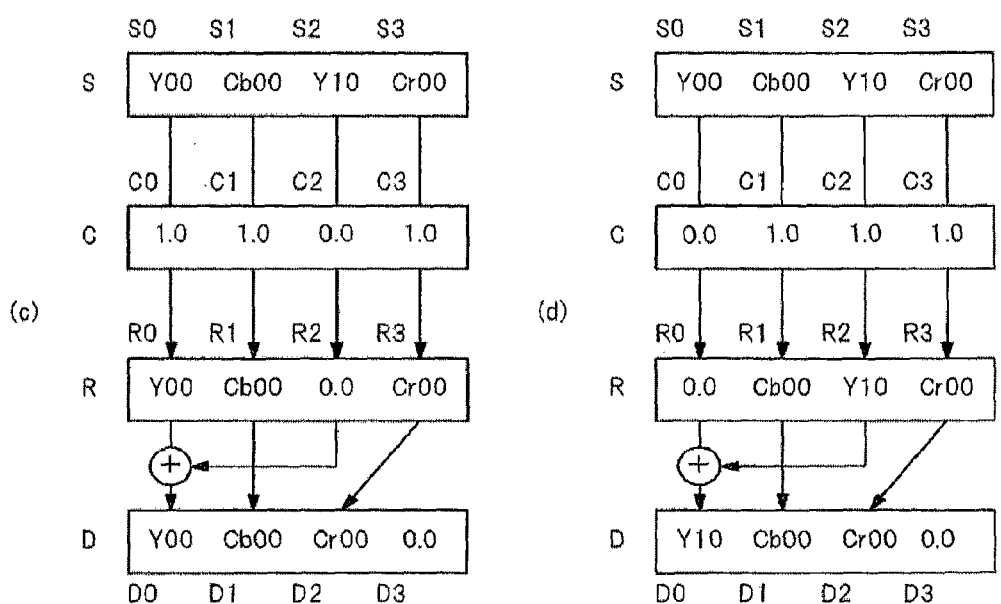
FIG. 5 is a schematic diagram showing pixel data treated in the fourth step in the format conversion shown in FIG. 3.

First sub step S41: One set of pixel data is loaded on the first register S of the pixel shader from the source texture. For example, as shown in FIG. 5(a), two sets of pixel data VS1 and VS2 are sequentially included in the head of the source texture. Here, as a result of the third step S3, the contents of the two sets of pixel data VS1 and VS2 are actually the same. Firstly, as shown in FIG. 5(c), the first pixel data VS1 is loaded on the first register S. Note that the orders of the components shown in FIGS. 5(a) and 5(c) are merely examples. If the component swizzling function of the pixel shader is used, when the pixel data VS1 from the source texture is loaded on the first register S, the order of the four components included in the pixel data VS1 can be changed to be in a desired order.

Second sub step S42: The data corresponding to one set of pixels is loaded on the second register C of the pixel shader from the coefficient texture. Here, the coefficient texture is formed with predetermined number of pieces of pixel data VC1 and VC2 and is stored in the VRAM 13 in advance. FIG. 5(b) shows an example of the coefficient texture. In the example of FIG. 5(b), the coefficient texture is formed with two sets of pixel data VC1 and VC2. The components of each of the pixel data VC1 and VC2 preferably represent any value of 0.0 and 1.0. The arrangement of the values is determined according to a change in the sampling frequency of each component involved in the format conversion of pixel data. In the conversion from the 4:2:2 to the 4:4:4, as shown in FIG. 5(b), two values of 0.0 and 1.0 are alternately set at the positions in every piece of pixel data corresponding to the positions of the luminance signals Y00 and Y10 in the source texture. In other words, the value 1.0 occurs at each position at a frequency ½ times the sampling frequency of the luminance signal Y, that is, at a rate of one per two sets of the pixel data. On the other hand, the value 1.0 is set to the positions corresponding to the positions of the color-difference signals Cb00 and Cr00 in the source texture. In other words, the value 1.0 occurs at each position at the sampling frequency of each of the color-difference signals Cb and Cr, that is, at a rate of one per one pixel data. In the second sub step S42, first, the first pixel data VC1 of the coefficient texture is loaded on the second register C.

Third sub step S43: The product of the i-th component Si of the first register S and the i-th component Ci of the second register C is calculated, and the obtained results are sequentially stored in the third register R of the pixel shader. Here, the parameter i is 0, 1, 2, or 3. The component swizzling function of the pixel shader can be used for selectively reading the i-th components Si and Ci from the registers S and C. For example, in FIG. 5(c), 0.0 is stored only in the third column of the second register C, and 1.0 is stored in the other columns thereof. Accordingly, as a result of the computation of the products between respective components of the first register S and respective components of the second register C, the pixel data stored in the third register R and the pixel data stored in the first register S are different from each other in that the third component R2 is 0.0.

Fourth sub step S44: The sum of the first component R0 and third component R2 of the third register R is calculated, and the obtained result is stored in the fourth register D. Here, the component swizzling function of the pixel shader can be used for selectively reading the first and third components R0 and R2 from the third register R. For example, in FIG. 5(c), the luminance signal Y00 is stored in the first column of the third register R, and 0.0 is stored in the third column thereof. Therefore, the sum Y00+0.0=Y00, that is, the luminance signal Y00 is stored in the first column D0 of the fourth register D.

Note that if a pair of first and third components S0 and S2 of the first register S and a pair of first and third components C0 and C2 of the second register C are treated as vector data, a combination of the product in the third sub step S43 and the sum in the fourth sub step S44 is equivalent to the scalar product between the two pieces of vector data: S0×C0+S2×C2=Y00×1.0+Y10×0.0=Y00. Accordingly, with respect to the first and third components of each of the registers S and C, the product in the third sub step S43 and the sum in the fourth sub step S44 may be optimized as a series of scalar product computations.

Fifth sub step S45: The second component R1 of the third register R is stored in the fourth register D. Here, the component swizzling function of the pixel shader can be used for selectively reading the second component R1 of the third register R. For example, the blue color-difference signal Cb00 that is stored as the second component R1 in the third register R shown in FIG. 5(c) is stored as the second component D1 in the fourth register D.

Sixth sub step S46: The fourth component R3 of the third register R is stored in the fourth register D. Here, the component swizzling function of the pixel shader can be used for selectively reading the fourth component R3 of the third register R. For example, the red color-difference signal Cr00 that is stored as the fourth component R3 in the third register R shown in FIG. 5(c) is stored as the third component D2 in the fourth register D.

Seventh sub step S47: A predetermined value is stored in the fourth component D3 of the fourth register D. Here, the component swizzling function of the pixel shader can be used for storing the predetermined value. For example, in FIG. 5(c), 0.0 is stored in the fourth column D3 of the fourth register D. Alternatively, a predetermined transparency may be stored in the fourth column D3 of the fourth register D.

Eighth sub step S48: One set of the pixel data is stored in the texture of the output destination from the fourth register D. Therefore, as shown in FIG. 5(e), in the texture of the output destination, the first pixel data VS1 is converted into the YCbCr 4:4:4 format. Note that as shown in FIG. 5(c), the fourth component of the converted pixel data VS1 is 0.0. Alternatively, the component may be a predetermined transparency.

First sub step S41: Next, as shown in FIG. 5(d), the second pixel data VS2 shown in FIG. 5(a) is loaded on the first register S.

Second sub step S42: As shown in FIG. 5(d), the second pixel data VC2 of the coefficient texture is loaded on the second register C.

Third sub step S43: The product of the i-th component Si of the first register S and the i-th component Ci of the second register C is calculated (i=0, 1, 2, 3). In addition, the obtained results are stored in the third register R. For example, in FIG. 5(d), 0.0 is stored only in the first column of the second register C, and 1.0 is stored in the other columns thereof. Accordingly, as a result of the computation of the products between respective components of the first register S and respective components of the second register C, the pixel data stored in the third register R and the pixel data stored in the first register S is different from each other in that the first component R0 is 0.0.

Fourth sub step S44: The sum of the first component R0 and the third component R2 of the third register R is calculated, and the obtained result is stored in the fourth register D. For example, in FIG. 5(d), 0.0 is stored in the first column of the third register R, and the luminance signal Y10 is stored in the third column thereof. Therefore, the sum 0.0+Y10=Y10, that is, the luminance signal Y10 is stored in the first column D0 of the fourth register D.

Note that if a pair of the first and third components S0 and S2 of the first register S and a pair of the first and third components C0 and C2 of the second register C are treated as vector data, a combination of the product in the third sub step S43 and the sum in the fourth sub step S44 is equivalent to the scalar product between the two pieces of vector data: S0×C0+S2×C2=Y00×0.0+Y10×1.0=Y10. Accordingly, with respect to the first and third components of each of the registers S and C, the product in the third sub step S43 and the sum in the fourth sub step S44 may be optimized as a series of scalar product computations.

Fifth sub step S45: The second component R1 of the third register R is stored in the fourth register D. For example, the blue color-difference signal Cb00 that is stored as the second component R1 in the third register R shown in FIG. 5(d) is stored as the second component D1 in the fourth register D.

Sixth sub step S46: The fourth component R3 of the third register R is stored in the fourth register D. For example, the red color-difference signal Cr00 that is stored as the fourth component R3 in the third register R shown in FIG. 5(d) is stored as the third component D2 in the fourth register D.

Seventh sub step S47: A predetermined value is stored in the fourth component D3 of the fourth register D. For example, in FIG. 5(d), 0.0 is stored in the fourth column D3 of the fourth register D. Alternatively, a predetermined transparency may be stored in the fourth column D3 of the fourth register D.

Eighth sub step S48: One set of the pixel data is stored in the texture of the output destination from the fourth register D. Therefore, as shown in FIG. 5(e), in the texture of the output destination, the second pixel data VS2 is converted into the YCbCr 4:4:4 format.

The foregoing sub steps S41 to S48 are repetitively performed on all the pixel data included in the source texture. Here, preferably, a texture wrapping function of the pixel shader is used for reading the coefficient texture in the second sub step S42, and in particular, a wrap texture addressing mode thereof is used. In other words, after the last pixel data included in the coefficient texture, i.e., the second pixel data VC2 in the example of FIG. 5(b), has been read, in the second sub step S42, the first pixel data of the same coefficient texture, i.e., the first pixel data VC1 in the example of FIG. 5(b), is read.

In this manner, the image processing system 10 converts the format of the pixel data included in the source texture from 4:2:2 to 4:4:4. In the conversion process, the operations of the respective sub steps S41 to S48 are common to all the pixel data independent of the position of each pixel data in the source texture. Particularly, no conditional branching is included. Accordingly, format conversion of pixel data can be implemented only by the functions of the pixel shader of the GPU 11 without using the CPU 21.

Figure 6:
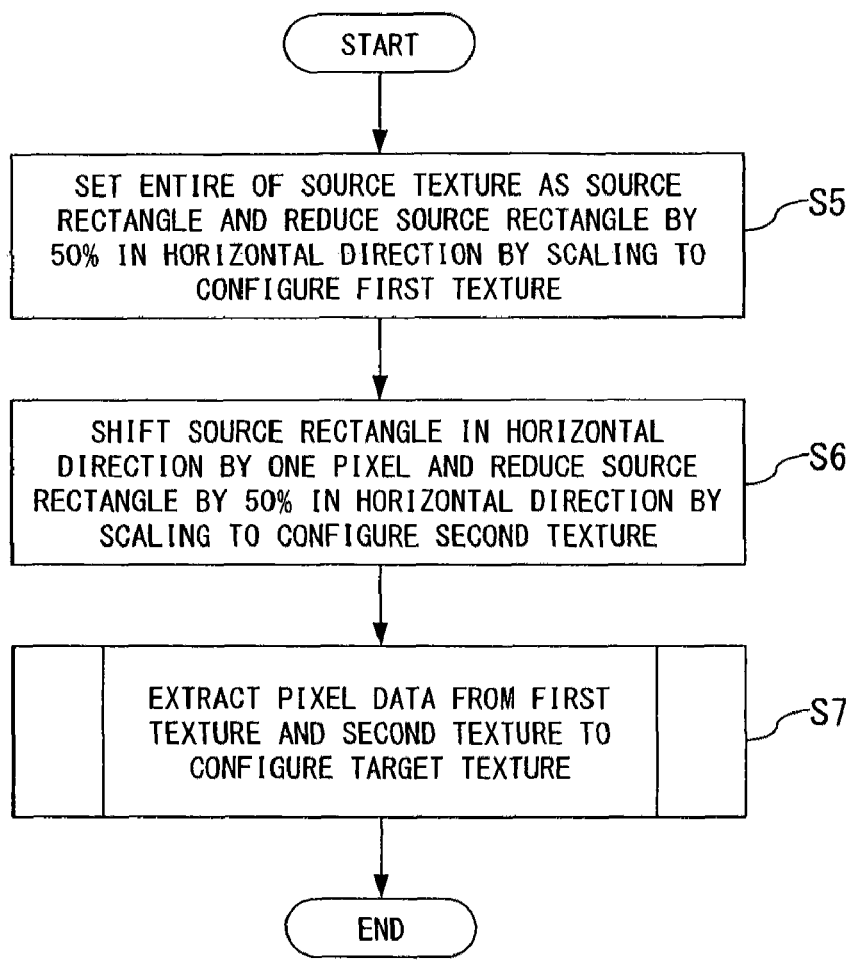
FIG. 6 is a flowchart showing format conversion of pixel data using down-sampling according to an embodiment of the present invention.

On the other hand, down-sampling from the YCbCr 4:4:4 to the YCbCr 4:2:2 is performed as follows. FIG. 6 shows a flowchart of the down-sampling.

Figure 8:
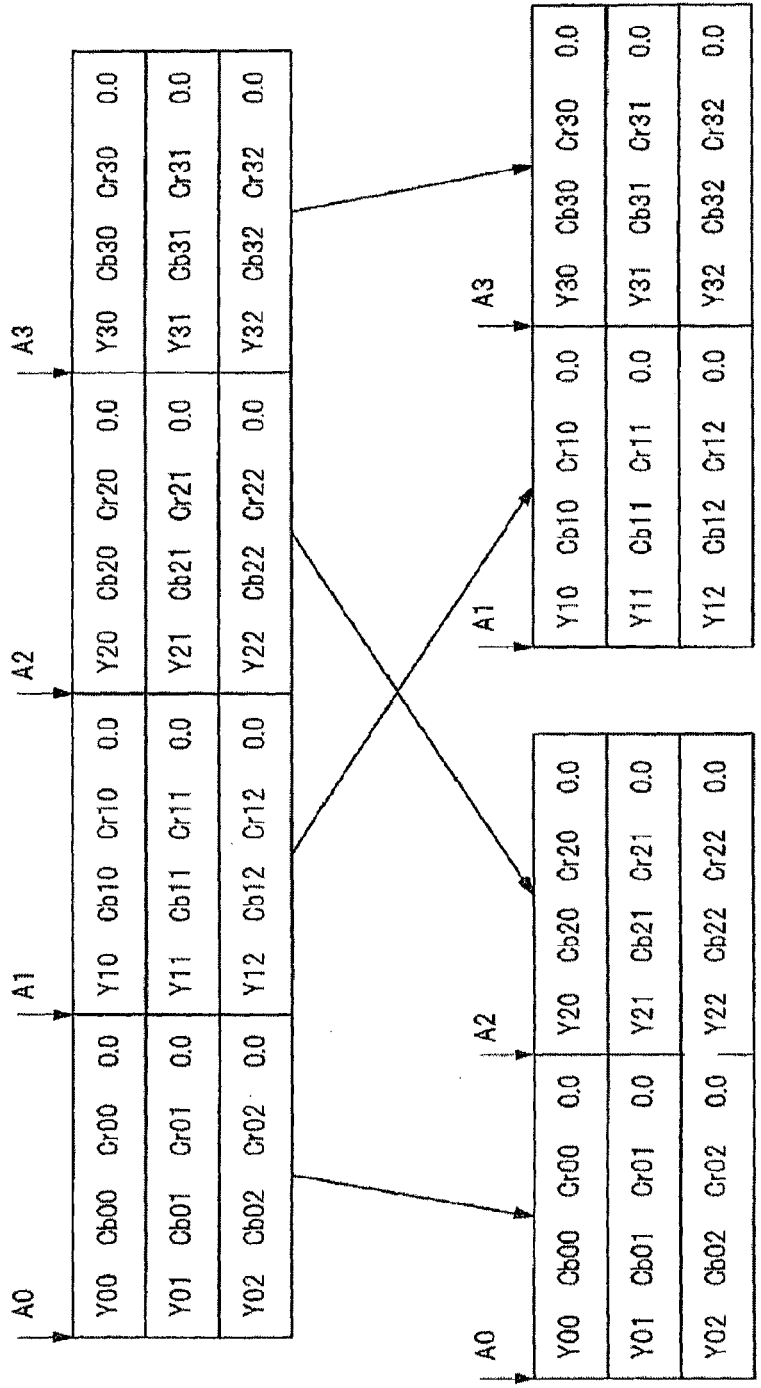
FIG. 8 is a schematic diagram showing an example of a source texture, a first array, and a second array shown in FIG. 6.

Here, the array of the pixel data of the YCbCr 4:4:4, which is to be processed, is stored as a texture in the VRAM 13. Hereinafter, the texture is referred to as a source texture. FIG. 8(*a*) shows an example of the source texture. As shown in FIG. 8, in the source texture, four components Yij, Cbij, Crij, and 0.0 (i, j=0, 1, 2, 3, ...) of the pixel data are arranged as one unit in a matrix pattern. Note that the fourth components are set to 0.0 for the convenience of the description below. However, the following operations are independent of the value of the fourth components. In addition, the order of the components in each pixel data is not limited to the order shown in FIG. 8, but may be arbitrarily selected.

Fifth step S5: First, the entirety of the source texture is set as a rectangle area which is to be processed. Hereinafter, the rectangle area is referred to as a source rectangle. Next, the source rectangle is reduced by 50% in the horizontal direction so as to configure the first texture T1 shown in FIG. 8(*b*). Specifically, first, as shown in FIGS. 8(*a*) and 8(*b*), one set of the pixel data is copied from the first address A0 of the source rectangle in the VRAM 13 as the first pixel data of the first texture T1. Next, the address A2 that is behind the first address A0 by the amount corresponding to two sets of the pixel data, that is, by two pixels is set as a reading start address. In addition, one set of the pixel data is copied from the reading start address as the second pixel data of the first texture T1. Thereafter, every time the reading start address is shifted in the horizontal direction by two pixels, the one set of the pixel data is read from the reading start address and is added to the first texture T1. In this manner, the first texture T1 is configured with odd-numbered pixel data that is counted from the head of the pixel data included in the source texture. Particularly, the number of columns of the first texture T1 is half that of the source texture.

Sixth step S6: First, the source rectangle is shifted on the source texture in the horizontal direction by the amount corresponding to one set of the pixel data, that is, by one pixel. Next, the source rectangle is reduced by 50% in the horizontal direction so as to configure the second texture T2 shown in FIG. 8(*c*). Specifically, first, as shown in FIGS. 8(*a*) and 8(*c*), one set of the pixel data is copied from the first address A1 of the source rectangle in the VRAM 13 as the first pixel data of the second texture T2. Next, the address A3 that is behind the first address A1 by two pixels is set as a reading start address, and one set of the pixel data is copied from the reading start address as the second pixel data of the second texture T2. Thereafter, every time the reading start address is shifted in the horizontal direction by two pixels, the one set of the pixel data is read from the reading start address and is added to the second texture T2. In this manner, among the pixel data included in the source texture, the second texture T2 is configured with even-numbered pixel data that is counted from the head of the pixel data included in the source texture. Particularly, the number of columns of the second texture T2 is half that of the source texture.

Figure 7:
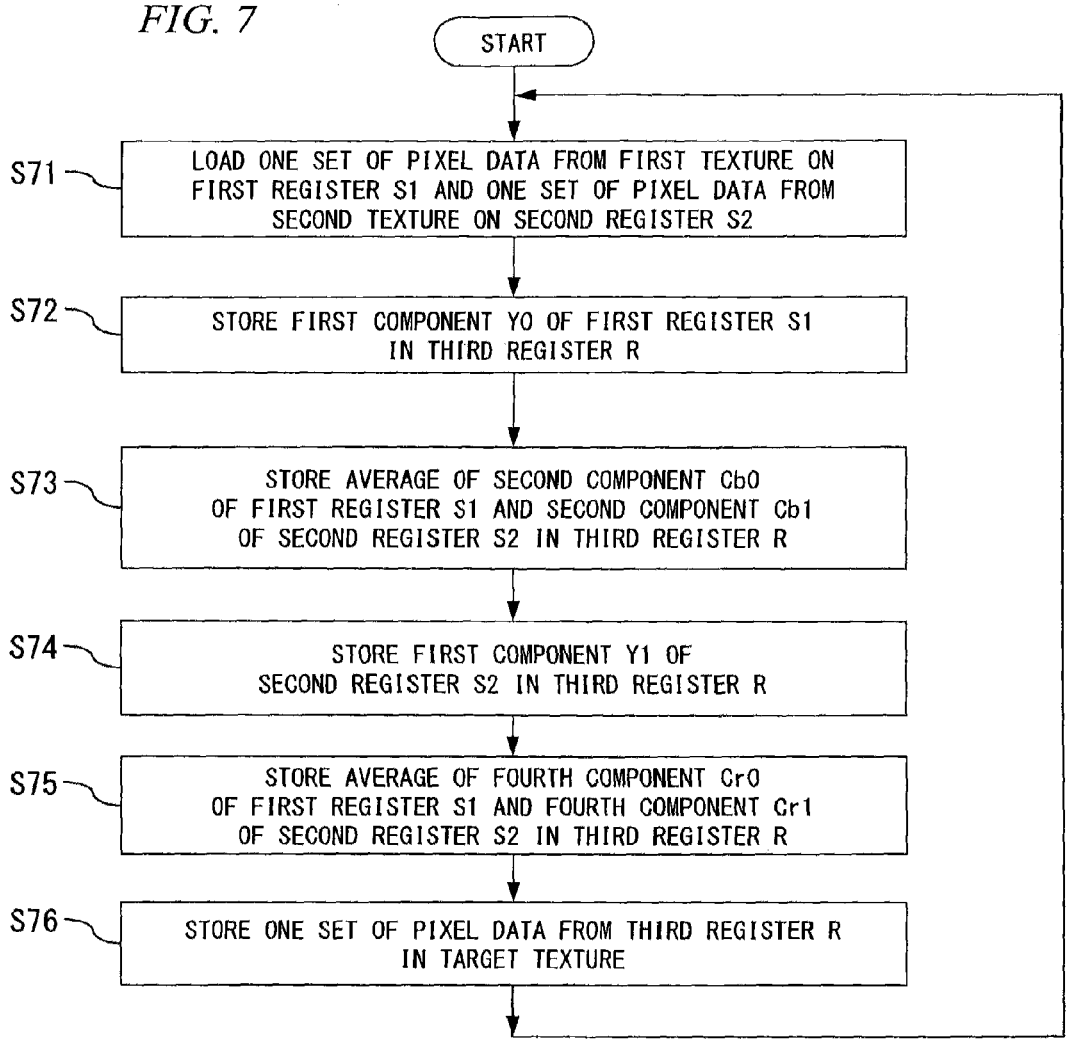
FIG. 7 is a detailed flowchart showing an operation of extracting pixel data from two arrays shown in FIG. 6.

Seventh step S7: A target texture is configured with the first texture T1 and the second texture T2 by using the pixel shader of the GPU 11 in the order of the following sub steps S71 to S76. In the target texture, the format of the pixel data is converted into the 4:2:2. FIG. 7 shows a flowchart of the seventh step S7.

Figure 9:
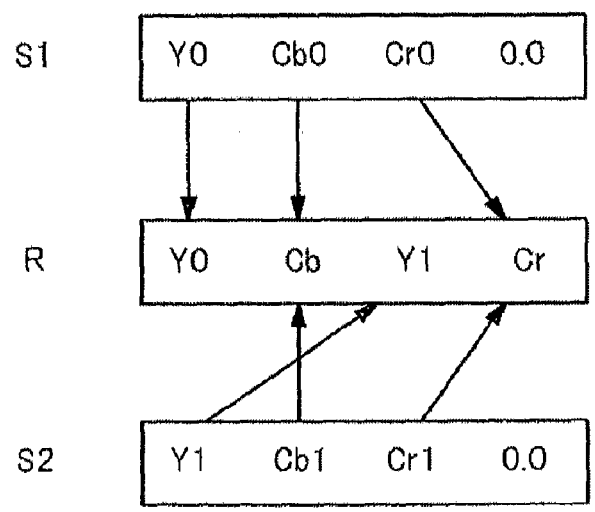
FIG. 9 is a schematic diagram showing an extraction operation of pixel data shown in FIG. 7.

First sub step S71: As shown in FIG. 9, four components Y0, Cb0, Cr0, and 0.0 of one set of the pixel data are loaded from the first texture T1 on the first register S1 of the pixel shader. On the other hand, one set of pixel data Y1, Cb1, Cr1, and 0.0 are loaded from the second texture T2 on the second register S2 of the pixel shader.

Second sub step S72: The first component Y0 of the first register S1 is stored in the third register R of the pixel shader. In other words, the luminance signal Y0 is stored in the first column of the third register R. Here, the component swizzling function of the pixel shader can be used for selectively reading the component Y0 from the first register S1.

Third sub step S73: Each of the second component Cb0 of the first register S1 and the second component Cb1 of the second register S2 is multiplied by the constant 0.5, and the resulting products are added to each other, so that the average of the two components Cb0 and Cb1 is calculated. In addition, the obtained result is stored in the third register R. Here, the functions of the pixel shader can be used for the computation. In addition, the component swizzling function of the pixel shader can be used for selectively reading the second components Cb0 and Cb1 from each of the registers S1 and S2. Accordingly, the average value of the blue color-difference signals Cb=(Cb0+Cb1)×0.5 is stored in the second column of the third register R.

Fourth sub step S74: The first component Y1 of the second register S2 is stored in the third register R. In other words, the luminance signal Y1 is stored in the third column of the third register R. Here, the component swizzling function of the pixel shader can be used for selectively reading the component Y1 from the second register S2.

Fifth sub step S75: Each of the fourth component Cr0 of the first register S1 and the fourth component Cr1 of the second register S2 is multiplied by the constant 0.5, and the resulting products are added to each other, so that the average of the two components Cr0 and Cr1 is calculated. In addition, the obtained result is stored in the third register R. Here, the functions of the pixel shader can be used for the computation. In addition, the component swizzling function of the pixel shader can be used for selectively reading the fourth components Cr0 and Cr1 from each of the registers S1 and S2. Accordingly, the average value of the red color-difference signals Cr=(Cr0+Cr1)×0.5 is stored in the fourth column of the third register R.

Sixth sub step S76: One set of the pixel data from the third register R is stored in the VRAM 13. Therefore, a target texture is configured from the pixel data in the format of YCbCr 4:4:4 shown in FIG. 9.

The foregoing sub steps S71 to S76 are repetitively performed on all the pixel data included in the first texture T1 and the second texture T2.

In this manner, the image processing system 10 converts the source texture formed from the 4:4:4:4 pixel data into a target texture formed from the 4:2:2 pixel data. In the conversion process, the operation of each of the sub steps S71 to S76 is common to all the pixel data independent of the position of each pixel data in the source texture. Particularly, no conditional branching is included. Accordingly, format conversion of pixel data can be implemented by only the functions of the pixel shader of the GPU 11 without using the CPU 21.

As described above, the image processing system 10 can execute format conversion of pixel data, particularly, both of the up-sampling and the down-sampling without executing conditional branches. In addition, the pixel shader of the GPU 11 can be used for format conversion of pixel data. Therefore, unlike the conventional system, the image processing system 10 converts the format of pixel data without use of the CPU 21 and at a higher speed than the CPU 21. Therefore, the load of the image process on the CPU 21 can be further reduced. In addition, the bandwidth of the main memory 23 for processes other than the image process can be further increased. Moreover, the frequency of the data transfer between the motherboard 20 and image processing system 10, particularly, the frequency of using the external bus 60 can be further reduced. As a result, the image processing system 10 can easily implement the entire image process at a higher speed than the conventional system.

Figure 10:
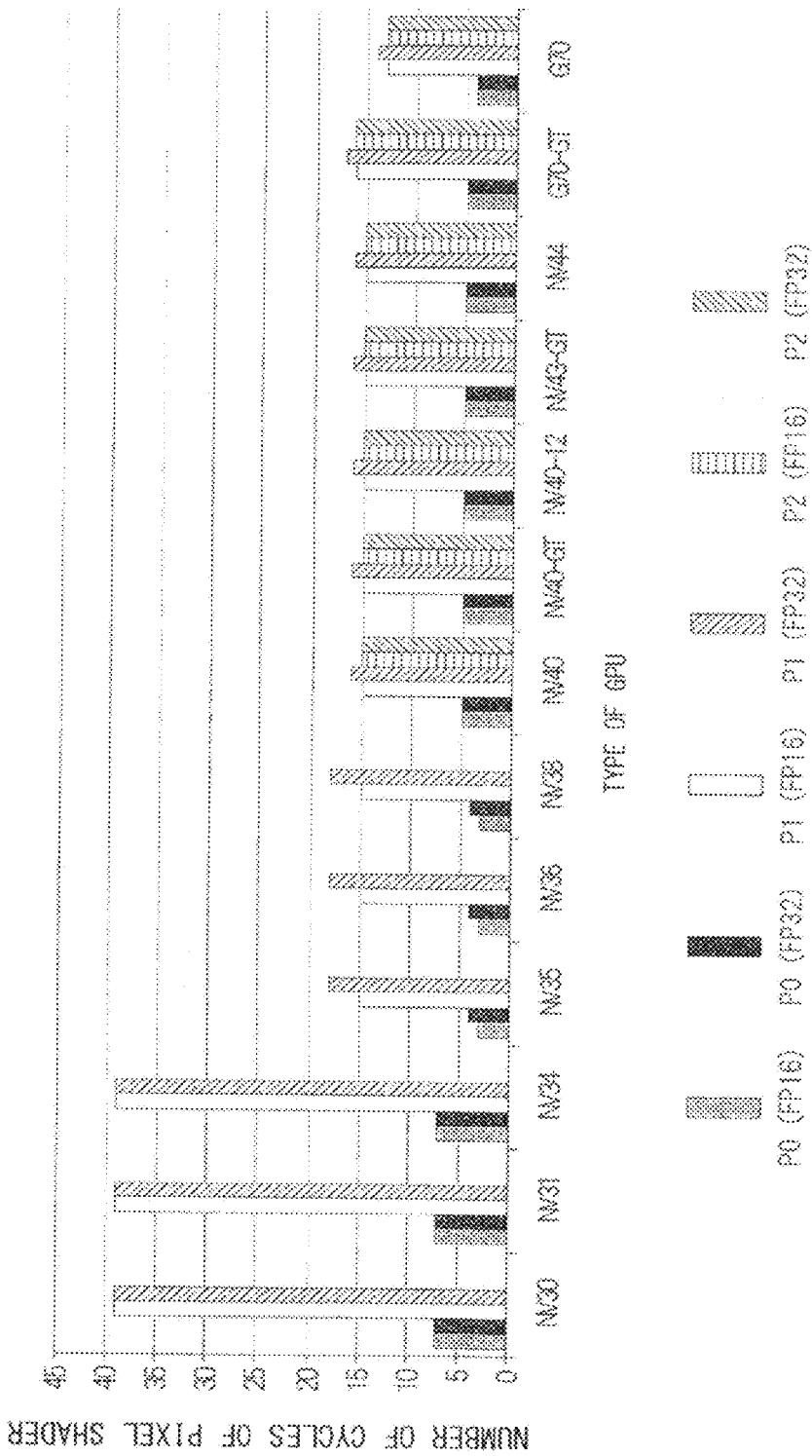
FIG. 10 is a graph showing a comparison of the number of cycles of a pixel shader between the case where format conversion according to an embodiment of the present invention is performed by various types of GPU and the case where conventional format conversion is performed by various types of GPU.
Figure 11:
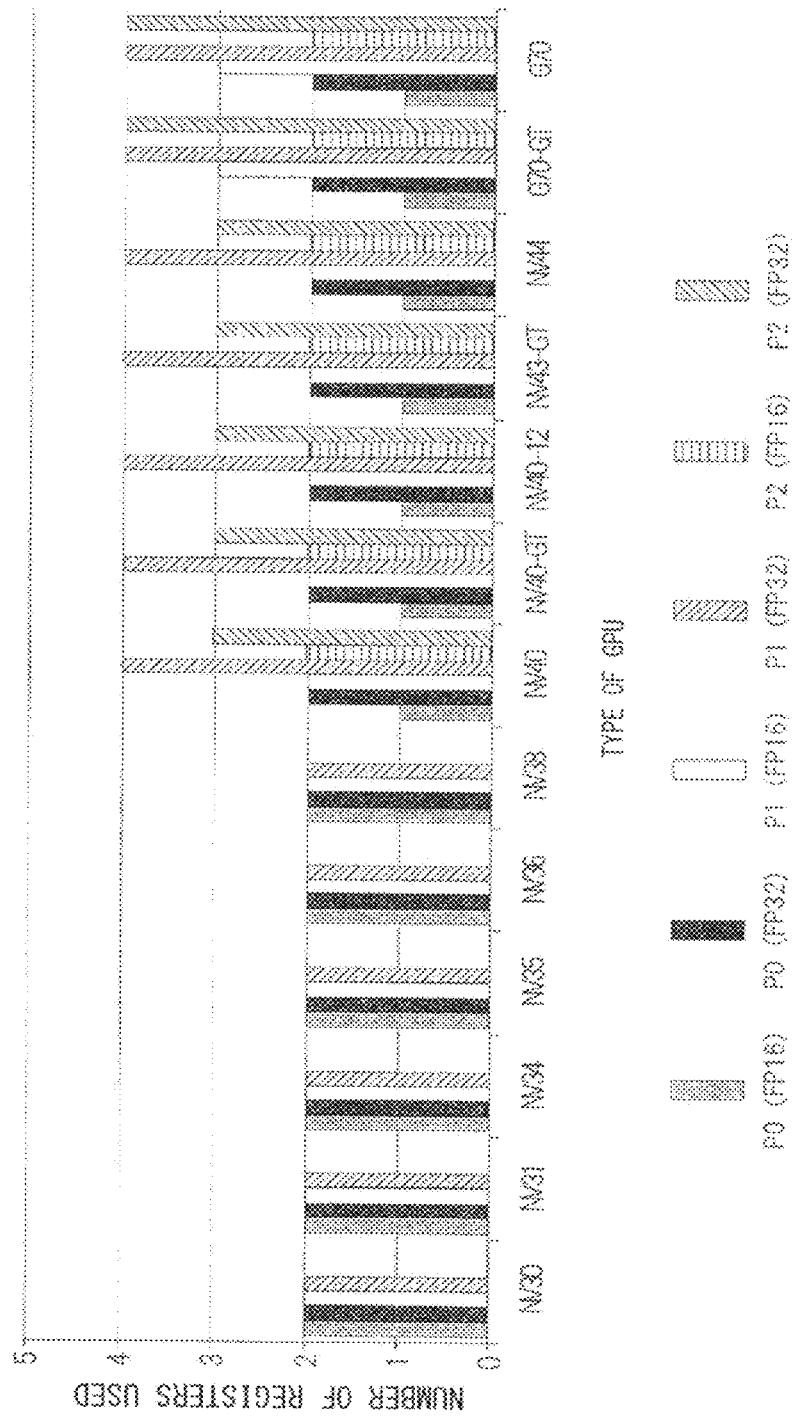
FIG. 11 is a graph showing a comparison of the number of registers used between the case where format conversion according to an embodiment of the present invention is performed by various types of GPU and the case where conventional format conversion is performed by various types of GPU.
Figure 12:
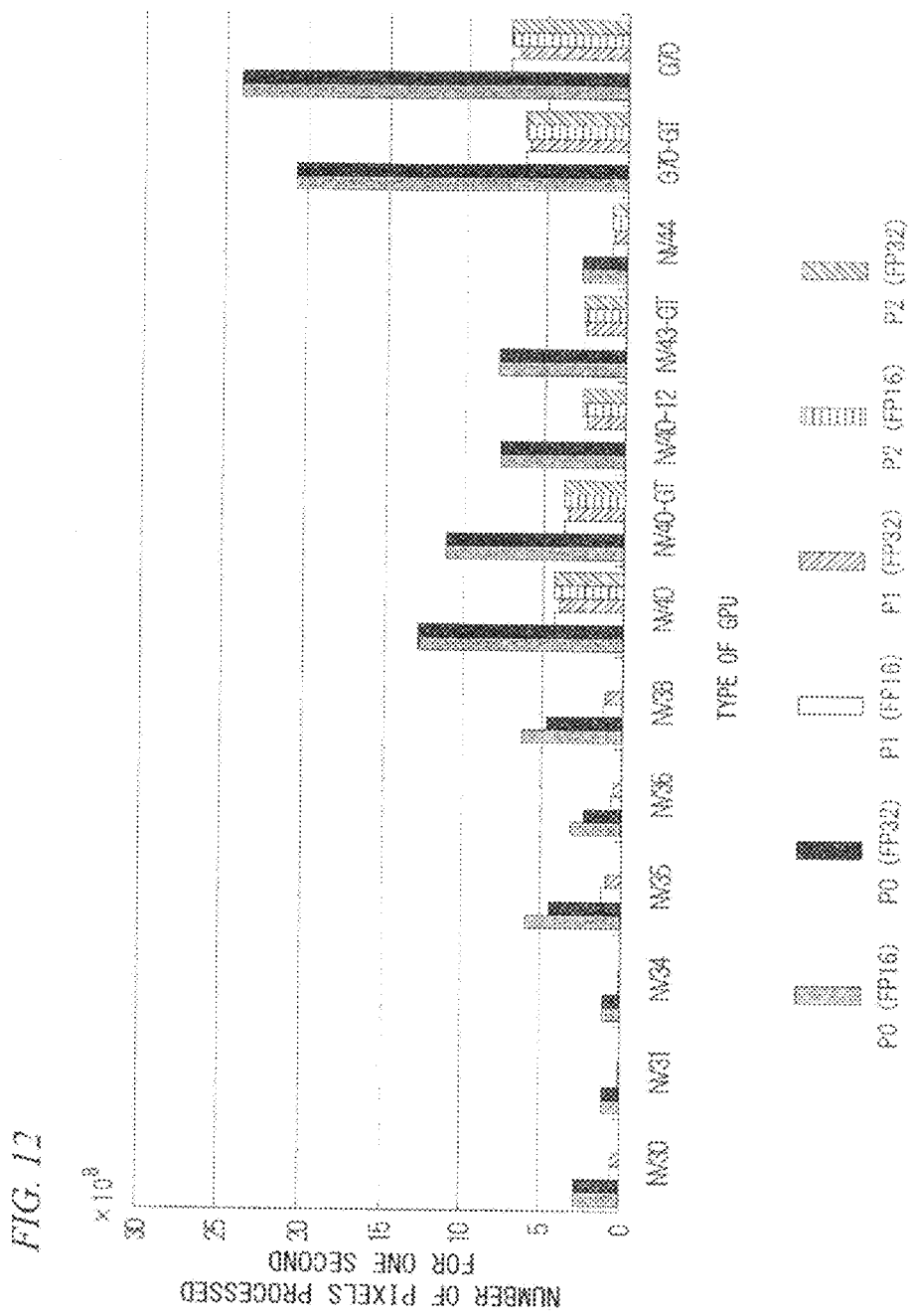
FIG. 12 is a graph showing a comparison of the number of pixels processed for one second between the case where format conversion according to an embodiment of the present invention is performed by various types of GPU and the case where conventional format conversion is performed by various types of GPU.

FIGS. 10 to 12 show results of a comparison of the foregoing format conversion process of pixel data with the conventional conversion process with respect to various types of the GPU. Note that the results shown in FIGS. 10 to 12 are obtained by analysis using a utility ShaderPerf. The utility is disclosed in the homepage (http://developer.nvidia.com/object/nvshaderperf_home.html) of the NVIDIA. Accordingly, all the GPUs that are used for the analysis are manufactured by the NVIDIA.

In FIGS. 10 to 12, the results of the case where each GPU is used as the GPU 11 of the image processing system 10 are shown by the bar graphs P0. On the other hand, the results of the cases where the conventional format conversion processes using the conditional branching are performed by each GPU are shown by the bar graphs P1 and P2. Note that the bar graph P1 shows the result of the case where the pixel shader of each GPU is Model 2.0, and the bar graph P2 shows the result of the case where the pixel shader of each GPU is Model 3.0. In addition, the "FP16" shows the case where the format conversion process is performed by the 16-bit FP display, and the "FP32" shows the case where the format conversion process is performed by the 32-bit FP display.

FIG. 10 shows the number of cycles of the pixel shader set for the format conversion process. As shown in FIG. 10, with respect to any GPU the number of cycles of the pixel shader in the format conversion process of the image processing system 10 is remarkably smaller than that in the conventional format conversion process.

FIG. 11 shows the number of registers used for the format conversion process. Here, these registers are registers embedded in the GPU manufactured by the NVIDIA. As shown in FIG. 11, the number of registers used for the format conversion process of the image processing system 10 is smaller than or equal to the number of registers used for the conventional conversion process. The difference does not directly means that "the format conversion process of the image processing system 10 has higher performance than the conventional conversion process". However, in general, as the number of the registers used for a process is smaller, the process has less influence on other processes allocated to the GPU. Accordingly, the following can be understood from the result shown in FIG. 11. The influence on the other processes allocated to the GPU exerted by the format conversion process of the image processing system 10 is reduced to be smaller than or equal to the influence exerted by the conventional format conversion process.

FIG. 12 shows the number of pixels processed for one second. As shown in FIG. 12, in comparison to a conventional conversion process, in the format conversion process of the image processing system 10, a remarkably larger number of pixels can be processed by any type of GPU.

In this manner, implementation of a high-speed format conversion process of pixel data by the image processing system 10 can be verified actually.

The invention claimed is:

1. An image processing apparatus comprising:
a scaling unit for performing a predetermined operation using a first array in which a plurality of pieces of pixel data are disposed in a matrix pattern as a unit to configure a second array, wherein each piece of pixel data in the first array includes a plurality of components being one unit in the first array;
a coefficient texture processing unit for repetitively performing a computation using a predetermined coefficient texture for every predetermined number of pieces of pixel data included in the second array; and
a pixel data converter for converting components of the predetermined number of pieces of pixel data obtained by rearranging components of every piece of the predetermined number of pieces of pixel data obtained by the computation using the coefficient texture; and
wherein the predetermined coefficient texture is formed with a predetermined number of pieces of coefficient data, each piece of coefficient data including four components.

2. The image processing apparatus according to claim 1, further comprising a processor for graphic processing,
wherein the pixel data converter uses a component rearranging function of the processor for the conversion of the components of the pixel data.

3. The image processing apparatus according to claim 1, wherein a sampling frequency of each of components of pixel data obtained by the pixel data converter is converted into a value different from a sampling frequency of each of components of the pixel data included in the first array.

4. The image processing apparatus according to claim 1, wherein the predetermined operation includes copying each column of the first array by a predetermined number of times in the horizontal direction in order to convert the predetermined texture into another texture.

5. The image processing apparatus according to claim 1, wherein the pixel data includes four components of 4:4:4:4 pixel data.

6. The image processing apparatus according to claim 1, wherein the conversion of the components of the pixel data comprises rearranging the components according to a change in sampling frequency of each component involved in the format conversion of the pixel data.

7. The image processing apparatus according to claim 1, wherein the predetermined operation and conversion is performed in common to the plurality of pieces of pixel data independent of a position of the pixel data in a source texture.

8. The image processing apparatus according to claim 1, wherein the predetermined operation and conversion is performed without conditional branching.

9. The image processing apparatus according to claim 1, wherein the conversion comprises one of upsampling and downsampling between two different sampling frequencies.

10. The image processing apparatus according to claim 9, wherein the two sampling frequencies comprise at least one of YCbCr 4:4:4, YCbCr 4:2:2, and 4:4:4:4.

11. An image processing method comprising the steps of:
performing, by a processor, a predetermined operation using a plurality of pieces of pixel data included in a first array in which the plurality of pieces of pixel data are arranged in a matrix pattern as a unit to configure a second array, wherein each piece of pixel data in the first array includes a plurality of components being one unit in the first array;
repetitively performing a computation using a predetermined coefficient texture for every predetermined number of pieces of pixel data included in the second array; and
converting components of the predetermined number of pieces of pixel data obtained by rearranging components of every piece of the predetermined number of pieces of pixel data obtained by the computation using the coefficient texture; and wherein the predetermined coefficient texture is formed with a predetermined number of pieces of coefficient data, each piece of coefficient data including four components.

12. The image processing method according to claim 11, wherein the step of converting the components of the predetermined number of pieces of pixel data uses a component rearranging function of a processor for graphic processing.

13. The image processing method according to claim 11, wherein a sampling frequency of each of components of pixel data obtained by the step of converting the components of the predetermined number of pieces of pixel data is converted into a value different from a sampling frequency of each of components of the pixel data included in the first array.

14. The image processing method according to claim 11, wherein the predetermined operation includes copying each column of the first array by a predetermined number of times in the horizontal direction in order to convert the predetermined texture into another texture.

15. The image processing method according to claim 11, wherein the pixel data includes four components of 4:4:4:4 pixel data.

16. The image processing method according to claim 11, wherein the predetermined operation and conversion is performed in common to the plurality of pieces of pixel data independent of a position of the pixel data in a source texture.

17. The image processing method according to claim 16, wherein the predetermined operation and conversion is performed without conditional branching.

18. The image processing method according to claim 11, wherein the conversion comprises one of upsampling and downsampling between two different sampling frequencies.

* * * * *